United States Patent

Watabe et al.

[11] Patent Number: 5,941,916
[45] Date of Patent: *Aug. 24, 1999

[54] DRIVING APPARATUS WITH A FUNCTION FOR DETECTING AN ELECTRIC CURRENT AND METHOD FOR DETECTING ITS ELECTRIC CURRENT

[75] Inventors: Mitsuru Watabe, Uridura-machi; Shoji Sasaki, Hitachinaka; Hideaki Ishikawa, Mito, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/667,646

[22] Filed: Jun. 21, 1996

[30] Foreign Application Priority Data

Jun. 22, 1995 [JP] Japan ................................. 7-155746

[51] Int. Cl.$^6$ .............................. G06F 17/00; G06F 7/00
[52] U.S. Cl. ............................... 701/22; 361/93; 361/189
[58] Field of Search .................................. 701/22, 34, 43; 318/434; 361/31, 93, 189; 363/21; 180/65.1, 65.2

[56] References Cited

U.S. PATENT DOCUMENTS 5,041,774  8/1991  Komatsu .
5,355,298  10/1994 Seki .
5,543,700  8/1996  Sakano et al. .

FOREIGN PATENT DOCUMENTS 6-39071  10/1994  Japan .

Primary Examiner—William A. Cuchlinski, Jr.
Assistant Examiner—Gertrude Arthur
Attorney, Agent, or Firm—Evenson, McKeown, Edwards & Lenahan, P.L.L.C.

[57] ABSTRACT

A driving apparatus is provided including a current detecting device for detecting electric current flowing through elements such as a sensor, a heater and an actuator, and switching devices for controlling electric current through the elements. The number of electric current detecting devices is reduced by using the devices in common. Switching the switching devices on-and-off is repeated. The electric current flowing in the element, which is to be detected, is detected by separation from another electric current that flows in the other elements

13 Claims, 7 Drawing Sheets

DRIVING APPARATUS WITH A FUNCTION FOR DETECTING AN ELECTRIC CURRENT AND METHOD FOR DETECTING ITS ELECTRIC CURRENT

BACKGROUND OF THE INVENTION

1. Field of the Invention

In a driving apparatus that drives a sensor, a heater and an actuator used for controlling power trains such as an engine or a change gear of automobiles, this invention is related to the driving apparatus with a function for detecting an electric current at the time of driving or a trouble diagnosis, and to a method for detecting its electric current.

2. Description of the Prior Art

In the prior art, at the time of driving or a trouble diagnosis of elements such as a sensor, a heater and an actuator used for controlling power trains such as an engine or a change gear of automobiles, driving apparatuses that drive each of the elements and devices for detecting the electric current that flows through each of the driving apparatuses were provided. The quantity of an electric current to operate a heater or an actuator was larger than that of another electric current to operate a sensor, therefore, it was necessary to reduce the electric current capacity of an electric current detecting device for detecting the electric current for a sensor and to increase the electric current capacity for a heater and an actuator. This operation is disclosed in Japanese utility model patent publication No. 6-39071, for example.

In the above prior art, the driving apparatus and the electric current detector are provided to every element, therefore, the number of driving apparatuses and electric current detectors are the same as the number of elements, consequently the enlargement of the whole driving apparatus becomes a problem. In addition, as the above elements were installed in a dispersed manner in many places of an automobile, a harness joining an element with a driving apparatus or with the electric current detecting devices or a harness linking between the electric current detecting devices and processing equipment for processing signals from the electric current detecting devices became complicated. Consequently, there was a problem that the electric circuit of the driving apparatus became complicated.

SUMMARY OF THE INVENTION

An object of the present invention is to provide a driving apparatus with a function for detecting an electric current. Further objects are to provide an electric circuit of the driving apparatus which is simple, while keeping the driving apparatus small, and to provide a method for detecting its electric current as well.

According to the present invention, there is provided a driving apparatus comprising current detecting devices for detecting electric current flowing through elements such as a sensor, a heater and an actuator, and switching devices for controlling the electric current through the elements. The number of electric current detecting devices is reduced by using the devices in common. The switching on-and-off of the switching devices is repeated and the electric current flowing in the element, which is to be detected, is detected by separating it from another electric current that flows in other elements. For example, when the switching device is on, the electric current corresponding to the driving apparatus flows and the element is driven. In one case, when one electric current detecting device is used, in spite of there being a plurality of driving apparatuses, the electric current detecting device detects the sum of the electric current through the plurality of driving apparatuses that are connected to the switching device. The electric current detecting device intermittently operates between the switching device corresponding to the element in which it wants to detect the electric current, and the driving apparatus. The value of the detected electric current, in case of intermittently operating the switching device, is different from that of other detected current in case of not intermittently operating the switching device. From this difference, the value of the electric current flowing in the element that is to be detected and flowing in the driving apparatus can be obtained. As mentioned above, the driving current of every element can be detected by a small number of electric current detecting devices. Therefore, this prevents the driving apparatus from becoming large, and its circuit from becoming complicated as in the prior art.

DETAILED DESCRIPTION OF THE EMBODIMENTS

Figure 1:
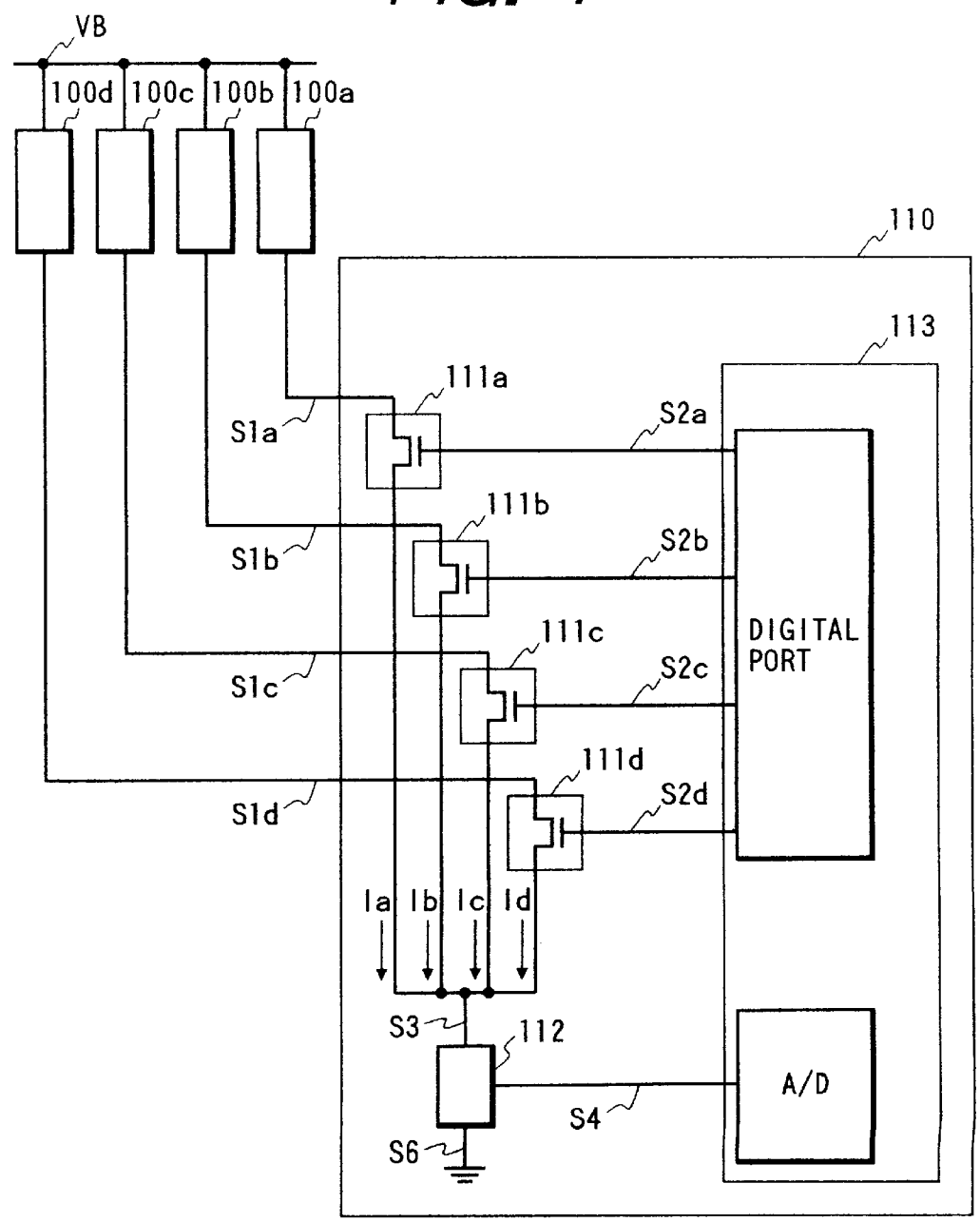
FIG. 1 is an electric circuit diagram of an example of a driving apparatus according to the present invention.

FIG. 1 shows an electric circuit diagram of one example of a driving apparatus according to the present invention. Elements such as 100a, 100b, 100c and 100d are sensors, heaters or actuators that operate by flow of an electric current. In a practical example for an automobile, the above mentioned elements 100a–100d can be an air-fuel ratio sensor used for an engine control, a heater for the air-fuel ratio sensor, an oxygen sensor, a heater for the oxygen sensor, a water temperature sensor, an oil temperature sensor for a change gear, a suction temperature sensor, a fuel temperature sensor and an actuator for controlling exhaust circulation.

In the case where one of the above elements is an oxygen sensor, the value of the electric current flowing through the oxygen sensor changes when the density of oxygen in the exhaust gas of the object changes. Therefore, the density of the oxygen can be found by detecting the value of this electric current.

When the electric current flows through the heater of the oxygen sensor, the oxygen sensor is activated because of the rise in temperature. However, when the heater operation deteriorates, for example due to prolonged use, the heater no longer provides a proper temperature. As a result, the oxygen sensor is not activated. In this case the engine cannot be controlled properly to keep the exhaust pure. Therefore, it is necessary to detect the deterioration of the heater. When the heater deteriorates such that the value of the electric current flowing through the heater changes, the deterioration can be diagnosed by detecting the value of this electric current. When the wiring to the heater is broken, the electric current is interrupted. As a result, the interruption can be detected by detecting the value of the electric current.

In the temperature sensors such as the cooling water temperature sensor, the oil temperature sensor, the suction temperature sensor or the other temperature sensors, the values of the current flowing in the sensors change according to the temperature of the measuring object. Therefore, the cooling water temperature can be found by detecting the value of the electric current of the cooling water temperature sensor for example. When the wiring to the cooling water temperature sensor is also broken, the electric current is interrupted. As a result, the interruption can be detected by detecting the value of the electric current. When the wiring connections are incorrectly connected, for example, during the checking or maintenance of the automobile, excess current sometimes flows through the driving apparatus that drives elements such as the above sensors via a short circuit. While also causing trouble for the elements such as the sensors, the excess current sometimes flows and, as the driving apparatus has broken down, normal control of the engine or the power train of the automobile cannot be carried out even if the defective sensor is replaced. In order to prevent this from happening, when the value of the detected electric current is excessive, the driving apparatus of the invention has the ability to protect itself by interrupting the electric current of the sensor and informing the operators of the abnormality.

FIG. 1 illustrates a case wherein the electric current flows through the driving apparatus from each element. This invention, as is explained later, also includes a case wherein the electric current flows out from the driving apparatus to each element. One side of the wiring of elements such as 100a, 100b, 100c and 100d is connected to a battery (not shown) as a power source VB and the other side is connected to the driving apparatus 110. Driving apparatus 110 comprises switching devices such as transistors 111a, 111b, 111c and 111d that correspond to each element, a conversion circuit 112 provided as a detection device for detecting the electric current of the elements, and a microcomputer 113. Microcomputer 113 is provided with a CPU(Central Processing Unit), a ROM(Read Only Memory), and a RAM (Random Access Memory) that are not illustrated, along with a digital port and an A/D converter (Analog to Digital Convertor). Each of the electric currents such as Ia, Ib, Ic and Id flow through each element by the conduction of their respective transistor 111a, 111b, 111c and 111d. The electric currents Ia, Ib, Ic and Id from each element are gathered or fed to the wiring S3, and are output to wiring S6 through the conversion circuit 112. In the example shown in FIG. 1, the electric current of each element flows to ground. Conversion circuit 112 converts the electric current into a voltage and outputs it through wiring S4. Wiring S4 is connected to the microcomputer 113. The value of the voltage is digitized by the A/D converter built-in the microcomputer 113. The electric current capacity of the switching devices, such as transistors 111a, 111b, 111c and 111d, is determined according to the quantity of the electric current of the elements to which they are connected. For example, the electric current capacity of the sensor can be small, while that of the heater is large. Conversion circuit 112 is set taking into consideration the quantity of the electric current and the voltage.

Microcomputer 113 outputs the keying signals from the digital port over wiring S2a, S2b, S2c and S2d, wherein the keying signals operate the transistors 111a, 111b, 111c and 111d. When the above keying signals have a value more than that of the transistors, the transistors operate or conduct such that the electric current flows through the elements corresponding to these transistors.

As mentioned above, it is necessary to detect each electric current of every element for a trouble diagnosis of each element and a protection from overcurrent. The signal on wiring S4 output from conversion circuit 112 shows the total value of the electric current of the elements such as the sensors 100a–100d. To detect the electric current in each element, the microcomputer 113 stops the other electric currents that flow through the remaining elements. For detection of either one electric current in each element, the electric current flowing to the remaining elements is interrupted by the microcomputer 113. As a result, only the electric current from one element, which is the detected electric current, flows through the conversion circuit 112. The signal from wiring S4 shows the value of the electric current of the one element mentioned above and the microcomputer 113 can detect only the value of the electric current of this element. Subsequently, the electric current again flows under the control of the microcomputer 113 to the remaining elements which were previously interrupted. At this time, the interruption time of the electric current of the remaining elements not included in the object of detecting the electric current is short. Therefore, the heater is not prevented from activating, and the control of the engine and the power train are not influenced by the change of the temperature of the temperature sensor. For example, 10 ms is the operation unit time of the element for detecting and driving by general engine control device, there is therefore no problem if the time for interrupting the electric current of the remaining elements for detecting the electric current of the above elements is 20 ms or less.

Figure 2:
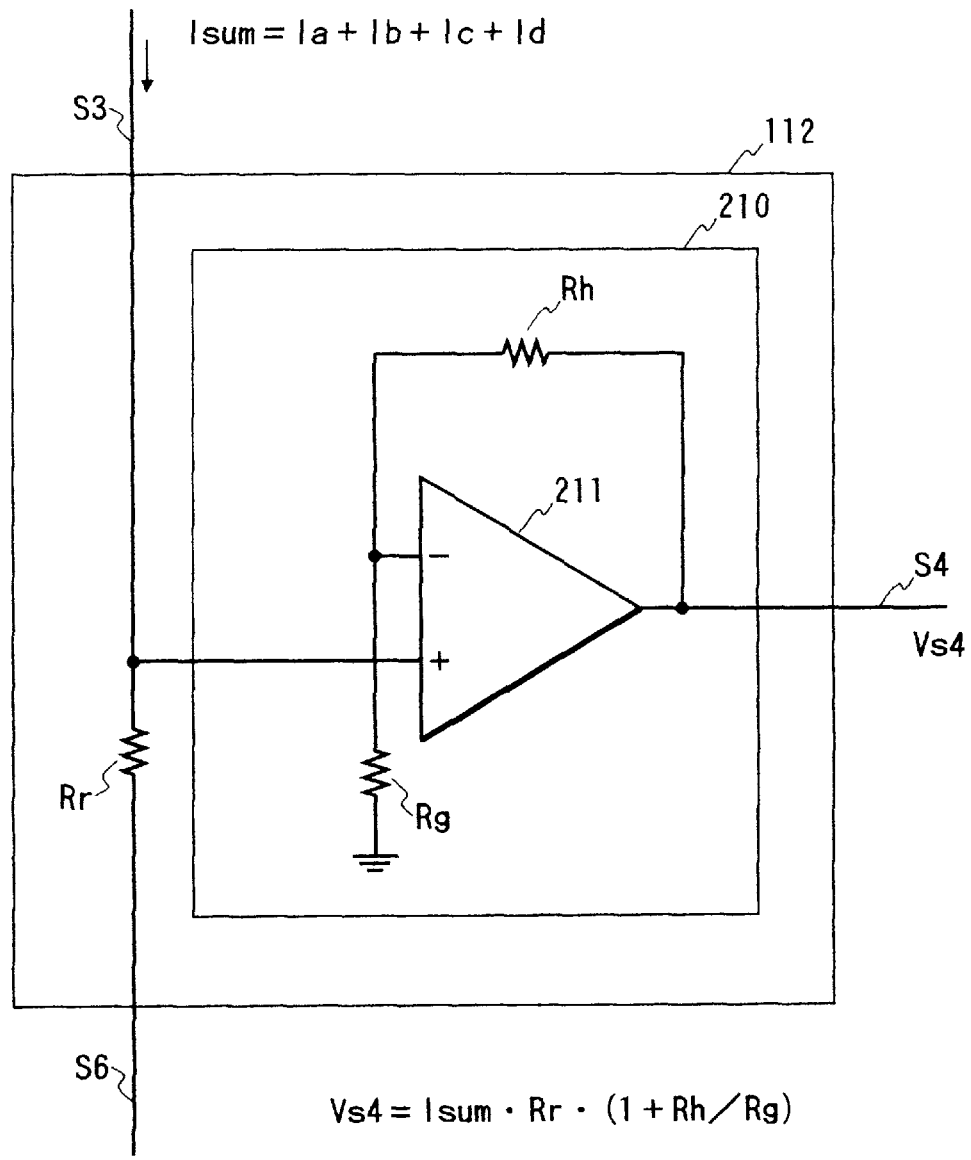
FIG. 2 is an electric circuit diagram showing a conversion circuit of the driving apparatus shown in FIG. 1.

FIG. 2 is an electric circuit diagram showing the conversion circuit of the driving apparatus 110 shown in FIG. 1. Conversion circuit 112 has resistor Rr between wiring S3 and wiring S6. The electric potential of wiring S3 is input into a differential amplifier 210. The differential amplifier 210 is composed of resistors Rh, Rg and an operational amplifier 211. The differential amplifier 210 amplifies the electric potential of input wiring S3 and outputs it to wiring S4, wherein the electric potential Vs4 of wiring S4 becomes the value shown in accordance with the equation:

$$Vs4 = Isum \cdot Rr(1 + Rh/Rg)$$

When the resistance value of resistor Rr is high, a normal operation is not enabled because of the decreasing value of the electric current flowing to each element. For example, when the electric current for the heater of the oxygen sensor decreases, the temperature of the oxygen sensor does not rise and the heater is not activated. In addition, when the resistance value is high, the electric power consumed at resistor Rr becomes large, and resistor Rr is thus destroyed. On the other hand, when the resistance value is too small, it is necessary to enlarge the amplification factor of differential amplifier 210 for supplying it to the A/D converter of the microcomputer 113. Because the A/D converter of microcomputer 113 digitizes the input voltage by the specified number of bits between the source voltage Vcc of the microcomputer 113 and the ground electric potential, when the maximum value of the input voltage is small, the quantization error becomes relatively large. However, the differential amplifier having a high amplification factor is generally easy to oscillate. Therefore, it is desirable that the resistance value of resistor Rr be as high as possible, and the amplification factor of the differential amplifier be lowered. Suitable values are 0.1~1.0 Ohms for resistor Rr and 5~20 times for the amplification factor.

Figure 3:
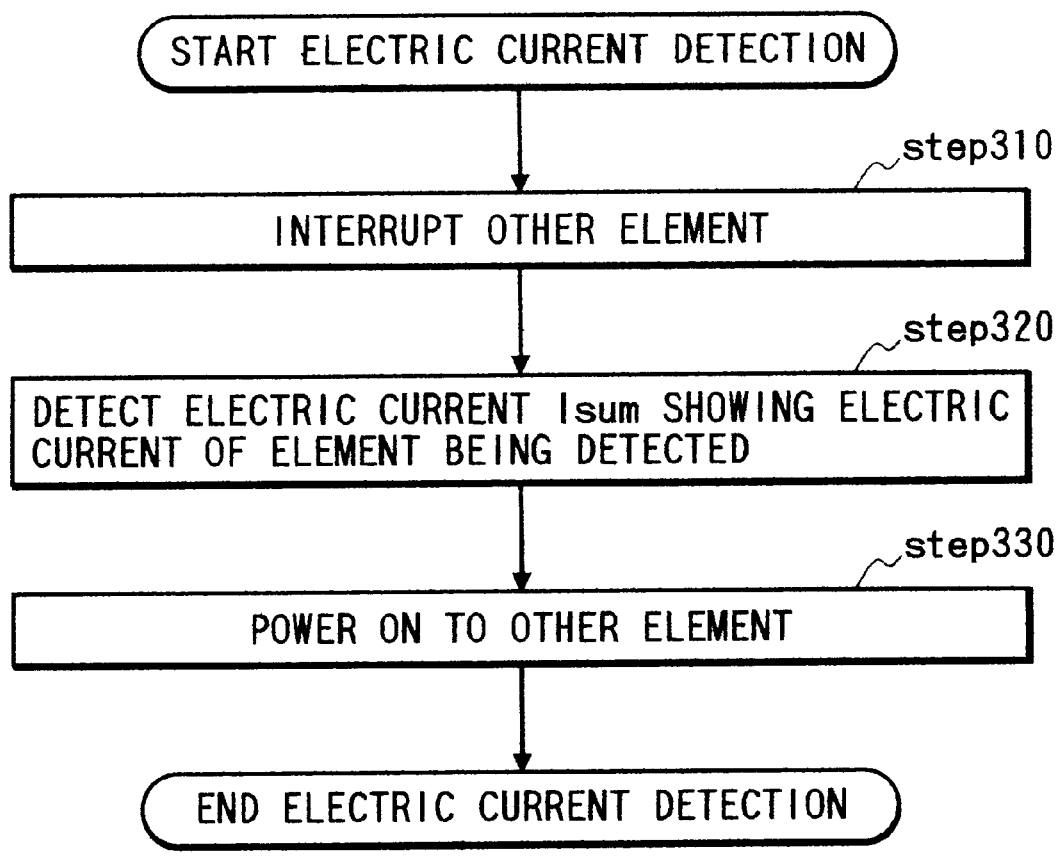
FIG. 3 is a control flowchart of a driving apparatus according to the present invention.

FIG. 3 is a control flowchart for a driving apparatus of an example according to the invention. The control flow of the driving apparatus related to electric current detection is carried out by the microcomputer 113. This control flow follows 3 steps that are input as a program in the ROM which is built-in the microcomputer 113.

First, in step 310, the electric current is interrupted in order to stop the electric current flowing through an element which is not to be detected. At this time, only the keying signal corresponding to the element to be detected, is greater than some activation value for the respective switching device, and the value of the other keying signals are less than the activation value.

In the next step 320, the electric potential on the wiring S4 is detected for the signal showing the value of the electric current of the element whose current is to be detected. This is done by converting it to a digital value via the A/D converter built-in the microcomputer 113.

In step 330, before the elements are influenced by the interruption of their electric current, the electric current again flows through those elements. As for the program to carry out the above steps, this program is preferably arranged so as to be operated near the main program of the microcomputer 113 in order to shorten the interruption period of the electric current. It is desirable that step 310 and step 330 be arranged in the part of the program that starts by constant period.

Figure 4:
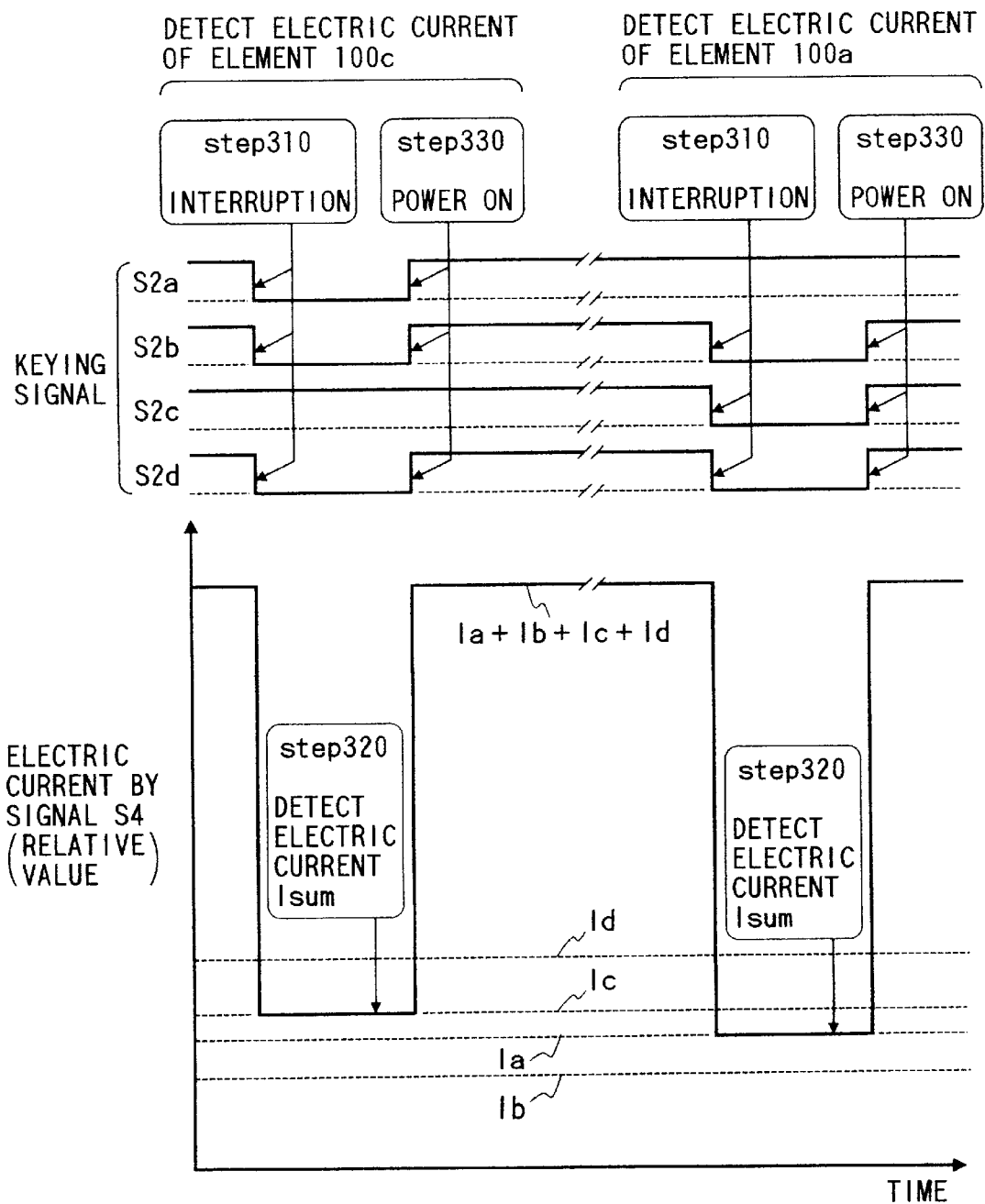
FIG. 4 is a signal wave form chart according to the present invention.

FIG. 4 is a signal wave form chart of an example of this invention. This example shows that the electric current of element 100c is first detected and then the electric current of element 100a is detected. In the electric current detection of element 100c, the current values of the keying signals S2a, S2b and S2d become less than some activation value in accordance with the interruption step 310 in FIG. 3. At this time, the signal of wiring S4 shows the value of the electric current of element 100c. In step 320 in FIG. 3, this value is detected by microcomputer 113. The current values of the keying signals of wiring S2a, S2b and S2d are later returned to a value greater than the activation value by step 330 such that the electric current again flows through elements 100a, 100b and 100d. Then, the current value of the signal for wiring S4 returns to the sum of the electric current values of each element. The detection of the electric current of element 100a is also carried out in the same manner as described above for the detection of the electric current of element 100c.

Figure 5:
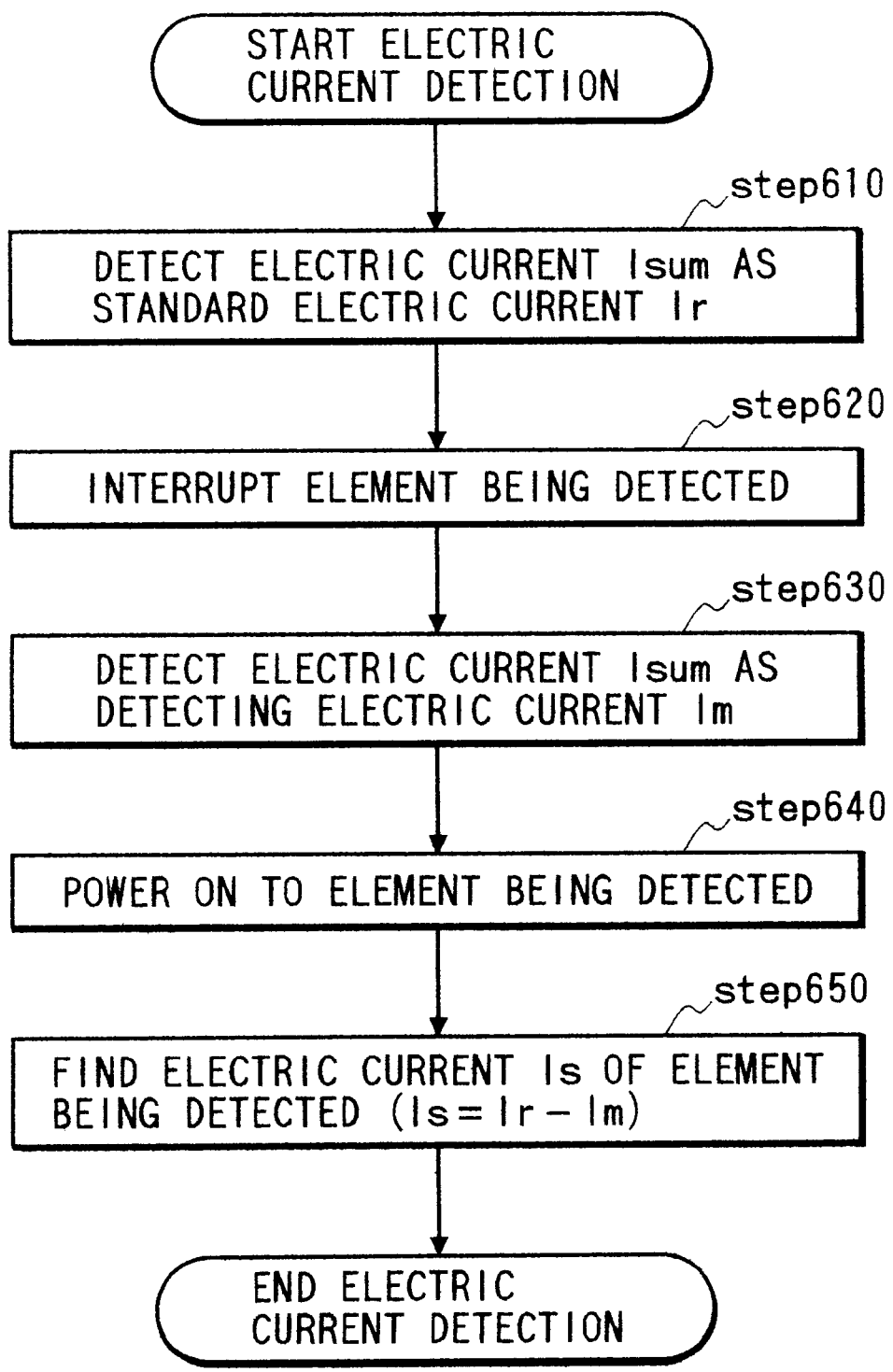
FIG. 5 is a control flowchart of another embodiment of a driving apparatus according to the present invention.

FIG. 5 is a control flowchart of a driving apparatus of another embodiment according to the invention. The control flow of the driving apparatus related to the detection of the electric current follows five steps that are carried out by the microcomputer 113.

In the first step 610, electric current Isum of the wiring S4 is detected by converting it to a digital value with the A/D converter that is built-in the microcomputer 113. This value is provided as a standard electric current Ir.

In step 620, the electric current of one element is interrupted. In this case, the value of the keying signal of a transistor, which corresponds to the element, is kept below some activation value, and the other values of the signals are maintained to the value before detection.

In the following step 630, the signal of wiring S4 showing a detected electric current Im, in which the value of the electric current of the element being detected is subtracted from the above standard electric current Ir, is converted to a digital value by the A/D converter built-in the microcomputer 113. In step 640, before the detected element is influenced by the interruption of the electric current, the electric current is again flowed into the element. In step 650, by subtracting the detection electric current Im from the above standard electric current Ir, the electric current of the above element is found.

As for the program for performing each step, the program is preferably arranged so as to be operated near the main program of the microcomputer 113 in order to shorten the interruption period of the electric current. It is desirable that step 620 and step 640 be arranged in the part of the program that starts by constant period.

Figure 6:
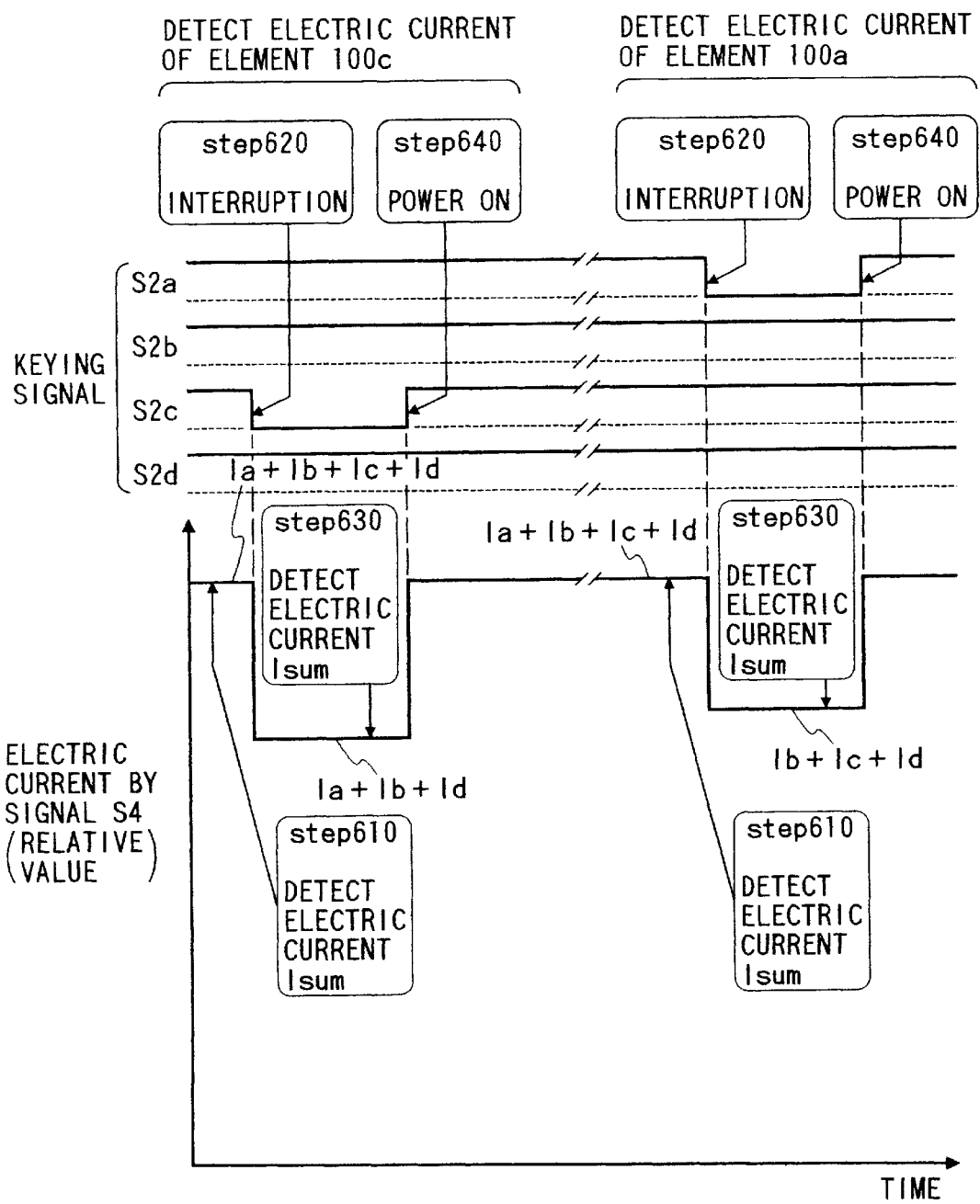
FIG. 6 is a signal wave form chart of another embodiment of a driving apparatus according to the present invention.

FIG. 6 is an exemplary signal wave form chart using the embodiment shown in FIG. 5. This example shows that the electric current of element 100c is first detected and then the electric current of element 100a is detected. In the electric current detection of element 100c, by detecting electric current Isum as a standard electric current Ir in step 610 in FIG. 5, the current value of the keying signal of wiring S2c becomes less than some activation value by the interruption process of step 620. At this time, the signal on wiring S4 has a value in which the electric current of element 100c is subtracted from the above standard electric current Ir. In the next step 630, this value is detected by the microcomputer 113 and is used as a detection electric current Im. Then, the current value of the keying signal of wiring S2c returns to a value greater than the activation value in step 640, and the electric current again flows through element 100c. Also, the current value of the signal for wiring S4 also returns to the total value of the electric current of each of the elements. The detection of the electric current of element 100a is also carried out in the same manner as described above for the detection of the electric current of element 100c.

Figure 7:
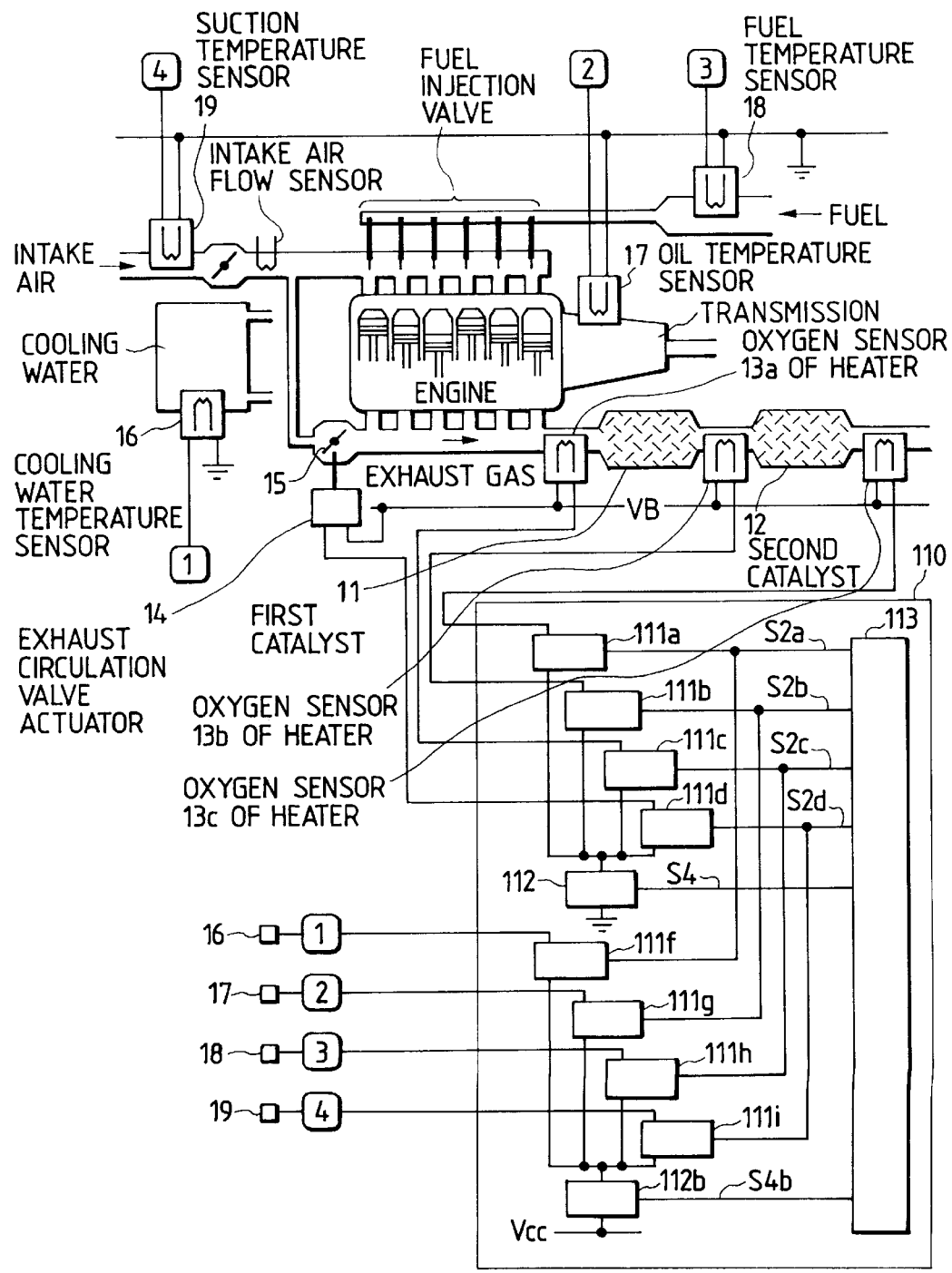
FIG. 7 is a block diagram illustrating a signal communication route for a driving apparatus according to the present invention applied to an engine control system of an automobile.

FIG. 7 is a block diagram showing a signal communication route in the case where a driving apparatus of this invention is applied to an engine control system of an automobile.

To confirm the cleaning of an exhaust gas, oxygen sensors 13a, 13b and 13c are arranged at three locations before and after the first catalyst 11 and the second catalyst 12. FIG. 7 is an example of applying the driving apparatus of this invention for detecting the electric current of the exhaust circulation valve actuator 14 that operates the three locations of the oxygen sensors and the exhaust circulation valve 15 of exhaust gas, cooling water temperature degree sensor 16, oil temperature sensor 17, fuel temperature sensor 18 and suction temperature sensor 19.

In the case of the above temperature sensors, the electric currents flow out from the driving apparatus 110 to each of these elements. Therefore, the terminals of elements 100a, 100b, 100c and 100d connected to a battery voltage VB in FIG. 1 are changed to a ground potential as shown in FIG. 7, wiring S6 of conversion circuit 112 is connected to a power supply Vcc of the microcomputer 113 from the ground in FIG. 1. Consequently, the driving apparatus 110 is composed of the oxygen sensor, conversion circuit 112 for an exhaust circulation valve actuator and conversion circuit 112b for a temperature sensor. The process of transforming the detection electric current of these temperature sensors to a value of a temperature is carried out continuously in accordance with the control flowchart shown in FIG. 3 and FIG. 5 by the microcomputer 113. According to the invention as described above, because the electric current flowing in a plurality of elements, such as the sensor, the heater and the actuator, can be detected by the simple electric current detection device, the cost of the control system can be minimized, and the equipment itself can be miniaturized and the circuit structure simplified. In addition, because of the small number of the driving apparatuses, an excellent effect can be gained so as to be easily installed in an engine space having a minimal amount of room in an automobile.

What is claimed is:

1. A driving apparatus with a function for detecting an electric current that drives a plurality of elements and detects a value of an electric current flowing in one of said plurality of elements, wherein said driving apparatus comprises:

a plurality of switching devices respectively connected to said plurality of elements to switch on-and-off said electric current flowing in said respective elements;

a conversion circuit that totals output electric currents from said switching devices;

electric current detecting means for detecting a value of an electric current output from said conversion circuit, wherein at least one of said switching devices is on and the other switching devices are off; and detecting means for detecting said value of said electric current flowing in said element which corresponds to said switching device which is on based on values from the electric current detecting means.

2. The driving apparatus with the function for detecting the electric current according to claim 1, wherein said element is at least one of a sensor for detecting a condition of an engine power train of an automobile, a heater for warming necessary parts or an actuator for controlling an operation of said engine power train.

3. A driving apparatus with a function for detecting an electric current that drives a plurality of elements and detects a value of an electric current flowing through one of said plurality of elements:

wherein said driving apparatus comprises:

a plurality of switching devices respectively connected to said plurality of elements, said switching devices receiving electric current from said elements and intermittently outputting said electric currents;

a conversion circuit that totals the output electric currents from said switching devices;

electric current detection means for detecting a value of an output electric current from said conversion circuit;

wherein by controlling on-and-off operations of one of said switching devices, a control detection means judges that an absolute value of a difference between fluctuations of said output electric current from said electric current detection means due to the on-and-off operations at this time is the electric current value flowing in one of said elements corresponding to said one switching device.

4. The driving apparatus with the function for detecting the electric current according to claim 3, wherein said control detection means turns on said one switching device that is connected to said one element for detecting said electric current in said elements.

5. The driving apparatus with the function for detecting the electric current according to claim 3, wherein said control detection means turns off said one switching device that is connected to said one element for detecting said electric current in said elements.

6. The driving apparatus with the function for detecting the electric current according to claim 3, wherein said electric current detection means comprises an amplifying circuit.

7. The driving apparatus with the function for detecting the electric current according to claim 3, wherein at least one of said elements is a heater that warms a sensor for detecting an air-fuel ratio of an internal-combustion engine.

8. An electric current detecting method of a driving apparatus with a function for detecting an electric current that drives a plurality of elements and detects a value of an electric current flowing in one of said plurality of elements, wherein said method comprises the steps of:

summing said electric currents that flow through an electric circuit containing switching devices connected to said elements;

memorizing said summed electric current value that is detected as a first electric current value;

turning off one of said switching devices which is connected to said one element for detecting said electric current in said one element;

summing said electric currents that flow through said electric circuit containing said switching devices connected to said remaining elements;

memorizing said totaled electric current value that is detected as a second electric current value;

judging that a difference, which is found between said first electric current value and said second electric current value, is an electric current that flows through said one element for detecting said electric current in said one element.

9. The electric current detecting method of the driving apparatus with the function for detecting the electric current according to claim 8, wherein a time period between the step of memorizing said first electric current value and said judgment step, is within 20 milliseconds, and wherein a difference value between said first electric current value and said second electric current value is the same as said electric current flowing in said one element.

10. An electric current detecting method of a driving apparatus with a function for detecting an electric current that drives a plurality of elements and detects a value of said electric current flowing in one of said plurality of elements, wherein said method comprises the steps of:

summing said electric currents that flow through an electric circuit containing switching devices connected to said elements when all of said switching devices are off;

memorizing said summed electric current value that is detected as a first electric current value;

turning off said switching devices connected to any other elements other than said element in which said electric current is to be detected;

again summing said electric currents that flow through said electric circuit containing said switching devices connected to said elements in which said electric current is to be detected;

again memorizing said summed electric current value that is detected as a second electric current value;

judging that an absolute value of a difference, which is found between said first electric current value and said second electric current value, is judged as said electric current flowing in said one element in which said electric current is to be detected.

11. The electric current detecting method of the driving apparatus with the function for detecting the electric current according to claim 10, wherein a time from a step memorizing said first electric current value to judgment, that is, the time for judging is within 20 milliseconds that a difference value between said first electric current value and said second electric current value is as same as an electric current flowing in said element for detecting said electric current.

12. A driving apparatus with a function for detecting an electric current that drives a plurality of elements and detects a value of an electric current flowing through one of said plurality of elements:

wherein said driving apparatus comprises:

a plurality of switching devices respectively connected to said plurality of elements, said switching devices receiving electric current from said elements and intermittently outputting said electric currents;

a conversion circuit that totals the output electric currents from said switching devices;

electric current detection means for detecting a value of an output electric current from said conversion circuit;

wherein by controlling on-and-off operations of said plurality of switching devices, a control detection means judges that an absolute value of a difference between the output electric current value when all of said plurality of elements are on and the output electric current value when all of said plurality of elements are on except for one of said elements that is to be detected is the electric current flowing in said one element to be detected.

13. A driving apparatus with a function for detecting an electric current that drives a plurality of elements and detects a value of an electric current flowing through one of said plurality of elements:

wherein said driving apparatus comprises:

a plurality of switching devices respectively connected to said plurality of elements, said switching devices receiving electric current from said elements and intermittently outputting said electric currents;

a conversion circuit that totals the output electric currents from said switching devices;

electric current detection means for detecting a value of an output electric current from said conversion circuit;

wherein by controlling on-and-off operations of said plurality of switching devices, a control detection means judges that an absolute value of a difference between the output electric current value when all of said plurality of elements are off and the output electric current value when all of said plurality of elements are off except for one of said elements to be detected is the electric current flowing in said one element to be detected.

* * * * *